United States Patent [19]

Beitel et al.

[11] 4,430,728
[45] Feb. 7, 1984

[54] COMPUTER TERMINAL SECURITY SYSTEM

[75] Inventors: James E. Beitel, Englewood; Charles R. Bruce, Littleton; Gary R. Cook, Denver, all of Colo.; Charles F. Mosier, Jr.; Edward L. Sartore, both of Findlay, Ohio

[73] Assignee: Marathon Oil Company, Findlay, Ohio

[21] Appl. No.: 335,972

[22] Filed: Dec. 29, 1981

[51] Int. Cl.[3] .................. G06F 15/16; G06F 3/04; H04L 9/00; H04M 11/00
[52] U.S. Cl. ............................ 364/900; 178/22.08; 178/22.09; 340/825.31; 340/825.34; 179/1.5 R; 179/2 DP
[58] Field of Search ... 364/200 MS File, 900 MS File; 340/825.3, 825.31, 825.34; 178/22.01, 22.08, 22.09, 4.1 B; 179/2 A, 2 C, 2 CA, 2 DP, 1 C, 1.5 R, 1.5 E

[56] References Cited

U.S. PATENT DOCUMENTS

| | | | |
|---|---|---|---|
| 3,314,051 | 4/1967 | Willcox et al. | |
| 3,647,973 | 3/1972 | James et al. | 179/2 DP |
| 3,723,655 | 3/1973 | Zucker et al. | 179/2 CA X |
| 3,806,882 | 4/1974 | Clarke | 364/200 |
| 3,938,090 | 2/1976 | Borison et al. | 179/2 CA X |
| 3,976,840 | 8/1976 | Cleveland et al. | 364/900 |
| 3,984,637 | 10/1976 | Caudill et al. | 364/200 |
| 4,087,635 | 5/1978 | Vasquez | 179/2 DP |
| 4,182,933 | 1/1980 | Rosenblum | 178/22.09 X |
| 4,218,738 | 8/1980 | Matyas et al. | 364/200 |
| 4,246,442 | 1/1981 | Hashimoto | 179/2 DP |
| 4,310,720 | 1/1982 | Check, Jr. | 340/825.31 X |
| 4,349,695 | 9/1982 | Morgan et al. | 178/22.08 |

OTHER PUBLICATIONS

"Automatic Telephone Dialers", Nov. 1979, Issue of Radio Electronics, pp. 48–51.

*Primary Examiner*—Eddie P. Chan
*Attorney, Agent, or Firm*—Jack L. Hummel

[57] ABSTRACT

The invention provides a system for securing the access of a remote computer terminal (130) to a centrally located host computer (300). The system includes a first security circuit (200) interconnected with a calling telephone (100), a calling modem (110), and the remote computer terminal (130) at the remote location for automatically dialing the number of the called telephone (310) at the location of the central host computer (300). A second security circuit (350) is located at the central host computer (300) and is interconnected with the called telephone (130), the called modem (330), and the central host computer (300). Upon receipt of the user identification code, the second security circuit (350) compares the user identification code with a stored code and, if verified, sends an acknowledgment signal back to the first security circuit (200). At this time, the two security circuits (200 and 350) activate respective solid state switches (260 and 370) to interconnect the host computer (300) with the remote computer terminal (130). A portable memory module (240) is selectively insertable in the first security circuit (200) to selectively activate and deactivate the first security circuit and which contains the secret phone number of the called telephone (310) at the host computer (300) as well as the secret user identification code.

3 Claims, 7 Drawing Figures

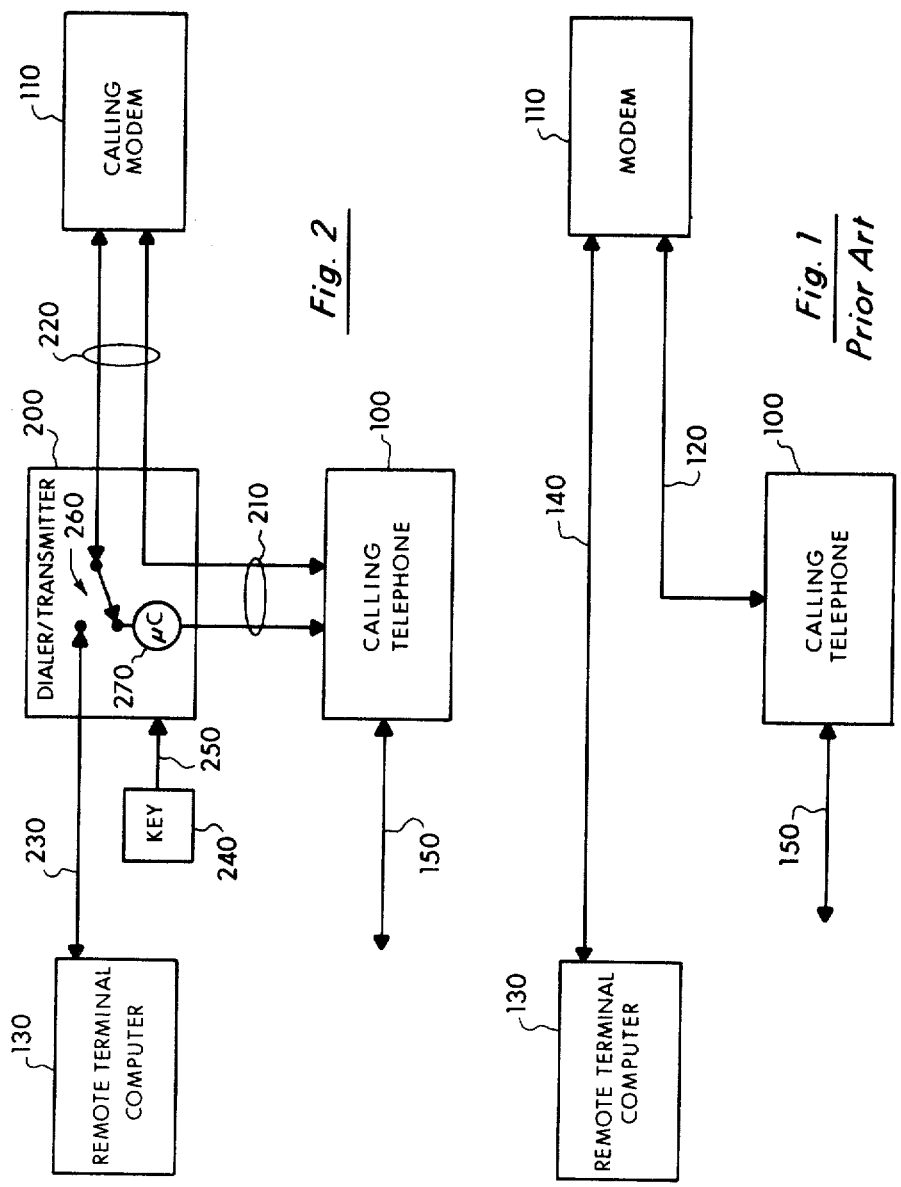

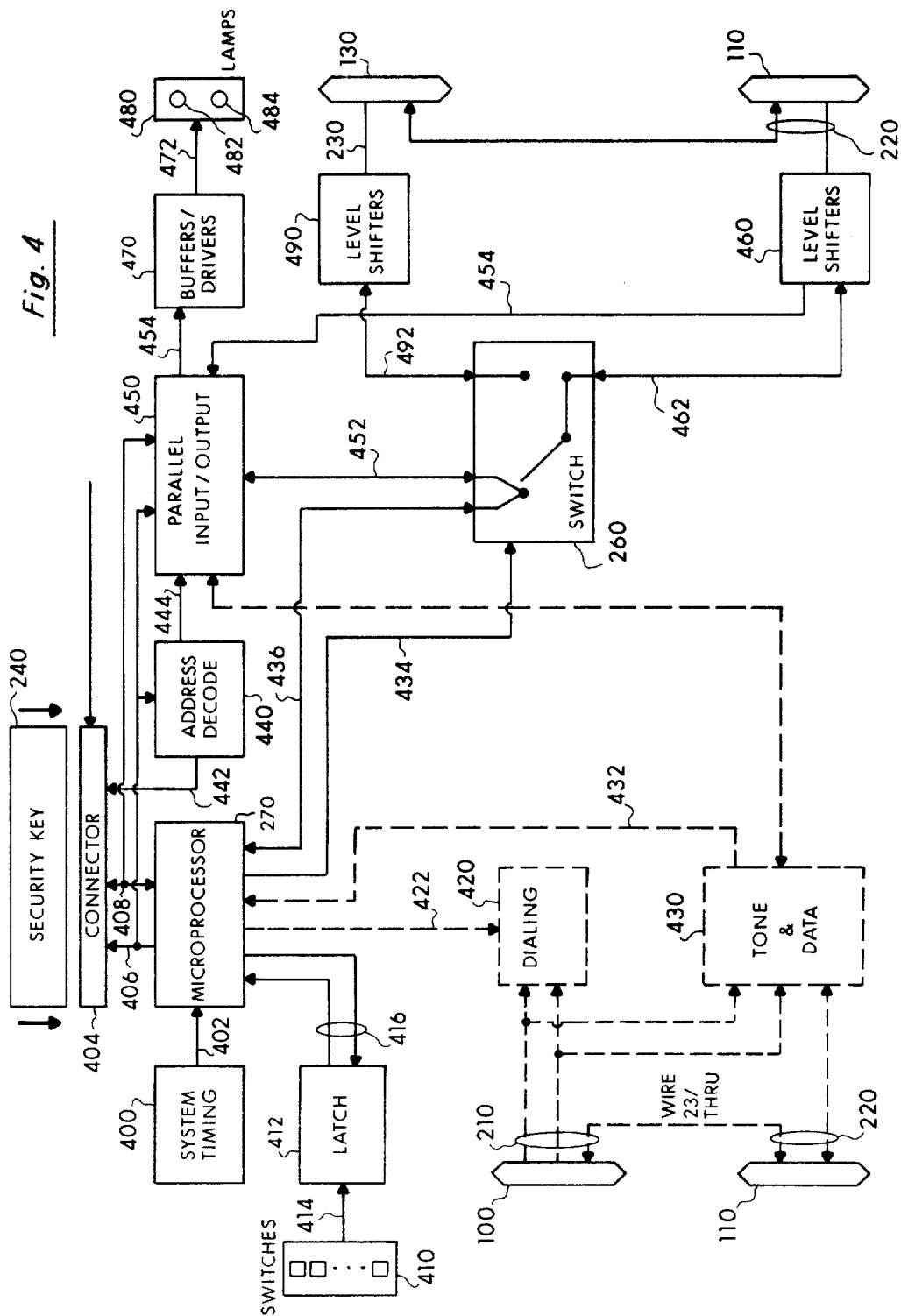

COMPUTER TERMINAL SECURITY SYSTEM

TECHNICAL FIELD

This invention relates to a security system for a remote computer terminal in gaining access to a host computer.

BACKGROUND ART

With the advent of time shared computers being accessed by a number of computer terminals at different remote locations, a need exists to prevent unauthorized entries into the host computer system from remote computer terminals.

Prior to the application of the present invention, the inventors caused a patentability search to be performed. The following are the results of that search:

| Inventor | U.S. Pat. No. | Issue Date |
|---|---|---|
| F. P. Wilcox et al | 3,314,051 | April 11, 1967 |
| Caudill et al | 3,984,637 | October 5, 1976 |
| Matyas et al | 4,218,738 | August 19, 1980 |
| James et al | 3,647,973 | March 7, 1972 |
| Tulio Vasquez | 4,087,635 | May 2, 1978 |
| Hashimoto | 4,246,442 | January 20, 1981 |

The 1967 patent issued to Wilcox, et al (U.S. Pat. No. 3,314,051) relates to a selective call data system wherein each remote station automatically transmits its identification coding to the central station. The identification coding is then re-transmitted by the central station back to the remote station.

The 1972 patent issued to James, et al (U.S. Pat. No. 3,647,973) relates to a computer system utilizing a telephone as an input device. This patent teaches the use of a conventional telephone as an input device to a computer.

The 1976 Caudill, et al patent (U.S. Pat. No. 3,984,637) relates to a computer terminal security system wherein a local code unit located at the remote computer terminal selectively communicates with a code receiver located at the main computer. The user of the remote terminal must key in on a keyboard a preset code. The first preset code connects the terminal to the modem at the remote location. Then a second preset code is transmitted to the code receiver at the central computer. If this code is authorized, the computer is then connected to the remote terminal.

When the proper first preset code is keyed into the keyboard, the modem at the remote terminal is activated. At this point, the modem is interconnected with a code transmitter. The code transmitter transmits the second preset code over the phone lines to the code receiver at the central computer which is then compared with a code set in the code receiver. A start switch must be manually activated to transmit the second code to the code receiver. When the second code is matched, the code receiver connects the computer to the remote terminal. Hence, Caudill requires a three step process. First, the central computer is dialed up by means of a secret number which the user at the remote location carries mentally. Secondly, the user at the remote location manually keys in a first preset code from memory to gain access to the equipment at the remote location. Once access is gained, the user activates the code transmitter which transmits a second preset code to a code receiver at the computer location for verification. If the code is verified, the computer is interconnected to the phone lines.

The 1978 patent issued to Vasquez (U.S. Pat. No. 4,087,635) relates to a method and system for carrying out calculations by means of a telephone set.

The 1980 patent issued to Matyas, et al (U.S. Pat. No. 4,218,738) relates to a method for authenticating the identity of a user in an information system. The patent sets forth an authentication process using a cryptographic arrangement to the function of a user's identity number, a user's separately entered password, and a scored test pattern.

The 1981 patent issued to Hashimoto (U.S. Pat. No. 4,246,442) relates to a method and device for confirming correct connection between data terminals in data communication systems using a telephone network. Hashimoto sets forth a technique for use between facsimile units which transmit data over phone lines. When one unit establishes a telephone communication with another unit, the called unit transmits an acknowledgement signal back to the calling unit. The calling unit then transmits two separate identification codes to the called unit. One code is the identification of the calling unit and the other is the identity of the called unit. Comparison of codes is made at the called unit.

In addition to the patents uncovered in the patentability search, the article entitled Automatic Telephone Dialers, appearing in the November, 1979 issue of Radio Electronics on pages 48 through 51 sets forth a number of conventional telphone dialers that may be utilized in conjunction with remote computer terminals.

None of the prior art approaches set forth a technique wherein both identity codes for users and secret telephone numbers for host computer locations are secured in places other than in the memory of the user. Indeed, all of the above prior art systems which relate to security rely upon the memory of the user to preserve at least the secrecy of the telephone number of the host computer.

DISCLOSURE OF INVENTION

The problem faced in securing access by a remote computer terminal to a centrally located host computer is to design a security system which can be easily modified for different access numbers when security is breached.

The computer terminal security system of the present invention provides a solution to the problem and includes a first security circuit interconnected with the calling telephone, the calling modem, and the remote computer terminal all at the remote location. It also includes a second security circuit interconnected with the called telephone, the called modem, and the host computer at the location of the central host computer. A portable memory module or security key contains the secret telephone number of the called telephone as well as the secret user identification code and selectively accesses the first security circuit for activation thereof. When activated, the first security circuit dials up the called telephone and transmits the user identification code to the second security circuit. Upon verification, the second security circuit sends an acknowledgment signal to the first security circuit. The security circuits together then activate solid state switches to interconnect the remote computer terminal to the host computer.

BRIEF DESCRIPTION OF THE DRAWING

FIG. 1 sets forth a block diagram of a prior art remote computer terminal hook up, FIG. 2 sets forth, in block diagram, the security dialer portion of the present invention at the remote computer terminal location, FIG. 3 sets forth, in block diagram, the security dialer portion of the present invention at the location of the host computer, FIG. 4 sets forth, in block diagram schematic, the various components of the security dialer of the present invention, FIG. 5 sets forth, in block diagram schematic, the security key of the present invention, FIG. 6 sets forth the flow chart for the security dialer portion shown in FIG. 2, and FIG. 7 sets forth the flow chart for the security dialer portion shown in FIG. 3.

BEST MODE FOR CARRYING OUT THE INVENTION

1. General Description

In FIG. 1, the known practice of placing a call on a conventional telephone 100 to a host computer located at a remote location, not shown, occurs first by dialing the number of the computer on a calling telephone 100 at the location of the user. The calling telephone 100 is conventionally interconnected with a modem 110 over lines 120. The modem 110, is also conventionally available and may comprise a number of different units and is, in turn, connected to a remote terminal computer 130 over lines 140. The telephone number of the computer, not shown, is dialed into the calling telephone 100 which then has access, conventionally, over phone lines 150 and phone network to the host computer. When the host computer, its telephone, and modem answers, it delivers a characteristic tone such as 2,000 Hz tone over lines 150 to the calling telephone 100. When the user of the telephone 100 hears the tone, he pushes the DATA BUTTON on the telephone 100 which causes lines 120 to be interconnected to lines 150 and the user can now utilize remote computer terminal 130 in direct communication with the host computer.

In this conventional approach, any unauthorized person can call anonymously into the host computer and even though that person may or may not be able to connect himself to the host computer, valuable computing time is wasted by tying up the incoming data line.

Figure 3:
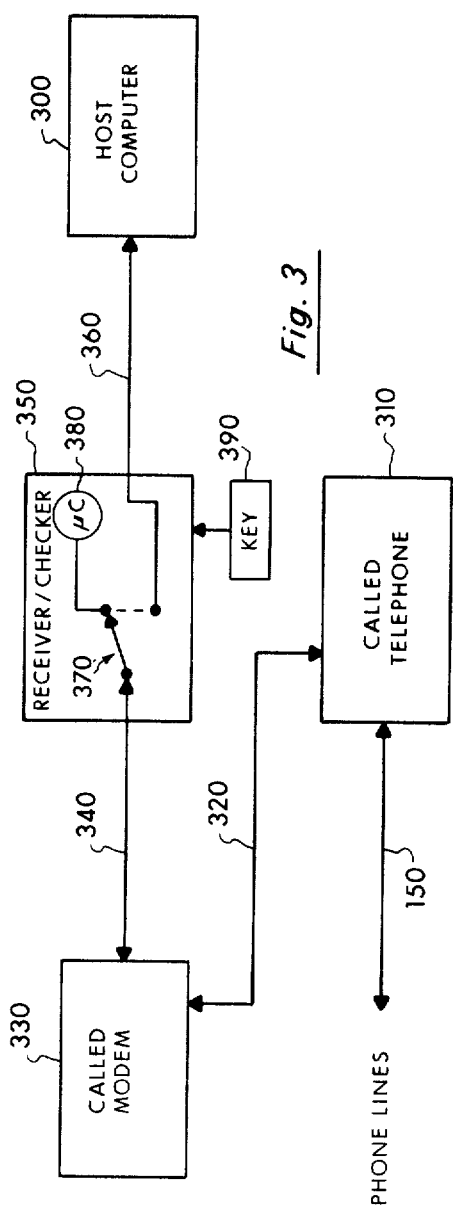

The present invention as set forth in FIGS. 2 and 3 provides security for accessing the host computer system by use of the security dialer apparatus of the present invention.

In FIG. 2, a conventional calling telephone 100 accesses the dialer/transmitter circuit 200 of the present invention over lines 210. Any conventional modem 110, such as a Bell Modem 208B, accesses the dialer/transmitter circuit or first security circuit of the present invention 200 over lines 220. And the conventional remote terminal computer 130 accesses the dialer/transmitter circuit 200 over lines 230. The dialer/transmitter 200 is activated by a memory module or security key 240 which is physically inserted into the dialer/transmitter circuit 200 and which is graphically represented by arrow 250.

Likewise, at the host computer 300 which is shown in FIG. 3, the conventional called telephone 310 is interconnected to the phone lines 150 and over lines 320 to the called modem 330 which in turn is connected over lines 340 to the receiver/checker circuit or second security circuit 350 of the present invention which is then interconnected over lines 360 to the host computer 300.

The general operation of the security dialer of the pesent invention which includes the dialer/transmitter circuit 200, the security key 240, and the receiver/checker circuit 350 will now be discussed. In order to operate the dialer/transmitter 200 of the present invention, the user must insert the key 240 therein. As will be described, the security key 240 is a portable module, but which contains coded memory information. Without the insertion of security key 240, the dialer/transmitter 200 cannot access the remote computer 300 and is inoperable. Once inserted, however, the security system of the present invention is activated and then the user pushes a button on the dialer/transmitter 200 which will automatically dial or outpulse the secret telephone number of the called telephone 310 shown in FIG. 3. The secret telephone number is encoded in the security key 240 and is not known to the user. Lights on the panel on the dialer/transmitter 200 become selectively illuminated with the commencement of dialing to signal when the called telephone 310 answers, when the host computer 300 is on line, and when the host computer 300 is off line.

Specifically in reference to FIG. 2, when the dialer/transmitter 200 is in the inactive state, switch 260 connects the modem to the calling telephone 100. When dialing is required, the microcomputer 270 outpulses the phone number of the called telephone 300 through the calling telephone 100 (without the handset being off the switch hook). When the call is completed and the called telephone 310 has answered, the microcomputer 270 sends a secret user identifying code over the phone lines 150 to the receiver/checker circuit 350 at the host computer 300. The secret user identification code is also encoded in the security key 240. After the coded identification number is sent, and verified by the receiver/checker 350, solid state switch 370 is activated to interconnect the host computer to the modem 330. An acknowledgment signal is then delivered from the receiver/checker circuit 350 to the dialer/transmitter circuit 200. Switch 260 is then activated to connect the calling modem 110 to the remote computer terminal 130.

At this point in time, the dialer/transmitter circuit 200 and the receiver/checker circuit 350 are transparent to the system and the system behaves in the conventional fashion. In the event that the microprocessor 380 in the receiver/checker circuit 350 detects an improper identification code, the receiver/checker 350 will send a not-acknowledged signal back and then terminate the call. If the user continues to try to tie up the line, only a few seconds will elapse before the user's line is successfully disconnected.

It is to be understood that based upon this operation, the key 240 contains the secret telephone number of the called phone 310, the secret identification number, and the programs necessary for proper sequencing of the microprocessor 270 and this information can be periodically changed to incorporate new secret telephone numbers for the called telephone 310 and new secret user identifier codes. Furthermore, the number and code are unknown to the user. They are contained secretly within the memory module or key 240.

Finally, it can be seen that a number of different security keys 240 could be given to a number of different users wherein each user has his own unique identification code. It is to be expressly understood, however, that the same identification code could be used for a group or, in fact, the entire population of authorized users.

In summary, a computer terminal security system is provided for the selective connection of a remote computer terminal 130 to a host computer 300 only when the secret telephone number of the host computer is correctly dialed and only when the secret user identity code is verified. This is accomplished by means of a first security circuit 200 at the remote computer terminal which is operative upon insertion of a portable memory module security key 240 containing the secret phone number and the secret user identity code for automatically dialing the host computer 300 and for delivering the user identification code. A second security circuit 350 located at the host computer receives the delivered user identification code and compares it to a stored code. Upon verification, the second security circuit sends an acknowledgment signal to the first security circuit. At this time both the first and second security circuits activate respective solid state switches to interconnect the remote computer terminal to the host computer.

Finally, in some applications the phone lines 150 are full-time private lines that are always connected. In such applications the above described calling function is not required.

2. Detailed Description

In FIG. 4, the details of the dialer/transmitter circuit 200 of the present invention are shown. The circuits for the dialer/transmitter circuit 200 and the receiver/checker circuit 350 are identical except that the dialer/transmitter circuit 200 contains the additional items set forth in dotted lines shown in FIG. 4.

Part of the system is the microprocessor 270 (or 380 for FIG. 3) which receives its timing signals from a system timing circuit 400 over lines 402. The microprocessor is a conventional Motorola Model No. MC6803 in the preferred embodiment. The microprocessor 270 is interconnected to the security key 240 through a rear panel connector 404 and communicates with the security key 240 over buses 406 and 408. The interconnection provides power and ground to the key 240 as well as the address and data buses, the module select, and the memory select and enable lines. The security key 240 contains the telephone number of the called telephone 310, the user identification code, and the necessary program to operate the microprocessor 270. All this information is stored in an erasable programmable memory (EPROM). The microprocessor 270 also communicates with a number of input switches 410 which communicates with a latch circuit 412 over lines 414. The latch circuit 412 in turn communicates over lines 416 with the microprocessor 270. The microprocessor 270 communicates with the dialing circuit 420 over lines 422 which access the tip and ring in lines 210 of the telephone 100. The tip and ring in lines 210 are also delivered into a tone circuit 430 which communicates with the microprocessor 270 over lines 432. The tone circuit 430 also communicates over lines 220 with the modem 110.

The microprocessor 270 is further interconnected with the solid state switch 260 over lines 434 and 436. The microprocessor 270 over bus 406 communicates with an address decode circuit 440. The address decode circuit 440 is interconnected over lines 442 to the connector 404 which accesses to the security key 240 and the address decode circuit further communicates with a parallel input and output circuit 450 over lines 444. The microprocessor 270 also communicates with the parallel input and output circuit 450 over buses 406 and 408. The parallel input and output circuit 450 is interconnected with the solid state switch 260 over lines 452 and with a level shifter circuit 460 over lines 454. The parallel input and output circuit 450 is also interconnected to the buffers/drivers circuit 470 over lines 454. The buffer/drivers circuit 450 accesses the front panel lamps 480 over lines 472. The level shifter circuit 490 accesses the solid state switch 260 over lines 492 and the remote terminal 130 over line 230. Finally, the level shifter circuit 460 also interconnects with the solid state switch 260 over lines 462.

In the preferred embodiment of FIG. 4, the following components are used:

System Timing 400—Fairchild Model No. F4702, 2.4576 MHz Crystal

Latches 412—National 74LS74

Dialing Circuit 420—ITT Model No. P1-3D-PC300D.S

Tone & Data Circuit 430—Signetics Model No. NE-567 (tone detectors), National Model No. LM339 (off-hook detector), and Sigma Reed Relay (Data Mode controller)

Address Decoder 440—Signetics Model No. 82S123 (PROM)

Parallel Input/Output 450—Motorola Model No. MC6821

Buffers/Drivers 470—National Model No. 4050

Level Shifters 490—Motorola Model No. MC1488

Level Shifters 460—Motorola Model No. MC1489

Figure 5:
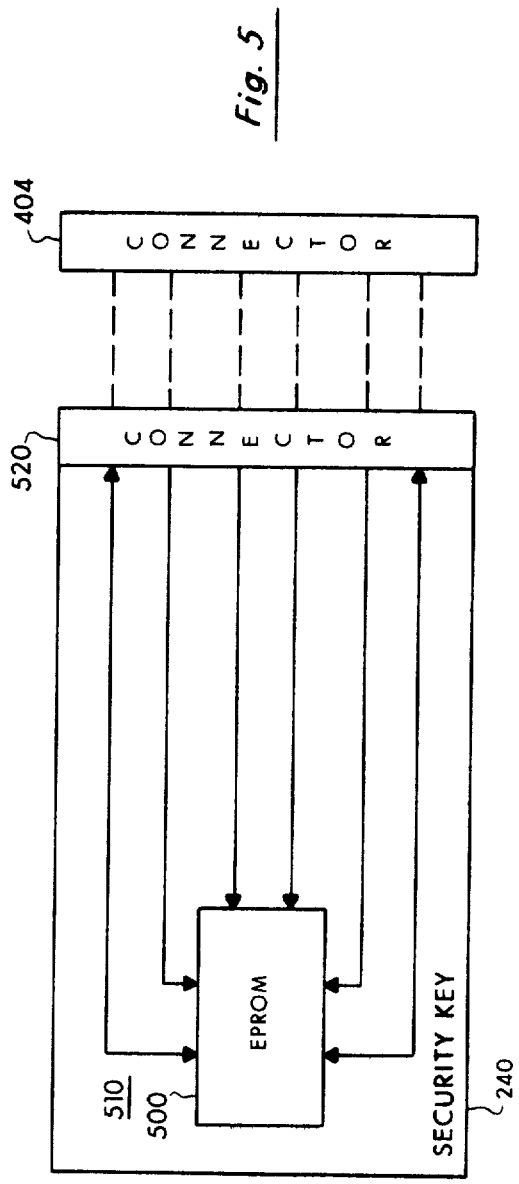

The security key 240 shown in FIG. 5 includes an erasable programmable memory 500 mounted on a printed circuit card 510 which has a terminal board 520 connected at one end. The security key is potted in epoxy resin so that it is difficult to tamper with. The program, the telephone number of the called telephone 100, and the user identifier code is contained in the erasable programmable memory. The information contained in this memory is hardware scrambled. In the preferred embodiment, there are eleven memory address and eight memory data lines coming from the memory chip 500. The memory chip preferably is a Motorola Model No. MCN2716. It is understood that the memory chip 500 being an erasable programmable memory can be erased and reprogrammed to incorporate new calling telephone numbers and new user identification codes on a selective basis. Indeed, programming for the microprocessor can be changed.

Figure 6:
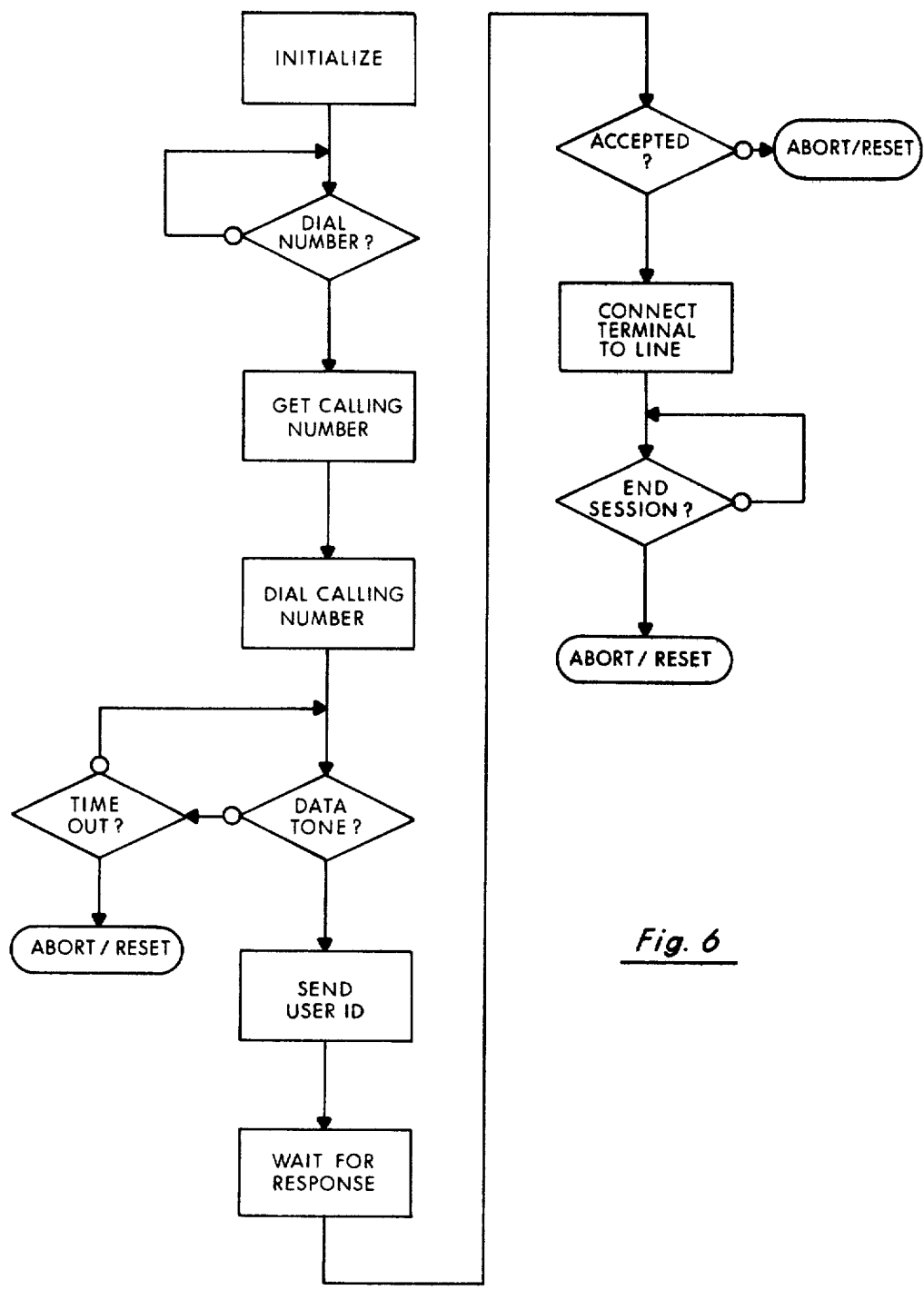

The operation of the circuit shown in FIG. 4 will now be discussed with reference to FIG. 6. FIG. 6 sets forth the flow sequencing contained in the memory found in the security key 240 as shown in FIG. 5.

Once the security key 240 is inserted into the dialer/transmitter circuit 200, the circuit becomes powered and activated and the user of the dialer/transmitter 250 effectuates dialing of the called telephone 310 system by pushing one of the switches 410. As set forth in the flow chart in FIG. 6, upon turn on of the dialer/transmitter circuit 250, the circuit shown in FIG. 4 becomes initialized. The microprocessor 270 then cycles through a loop until one of the switches 410 are activated indicating that the microprocessor 270 should dial the phone number of the called telephone. Upon sensing the activation of the switch in the latch circuit 412, the microprocessor 270 then accesses the erasable programmable memory circuit 500 in the security key 240 in order to obtain the secret phone number of the called telephone 310. The microprocessor then generates dialing control signals to operate the dialing circuit 420 to outpulse the number of the called telephone 310 at ten pulses per second. After dialing, the microprocessor 270 waits until the tone circuit 430 senses a 2000 Hz data tone coming back from called telephone 310. If the data tone is not received within a predetermined time frame, such as two seconds, a time out occurs and the call is aborted and everything reset.

In the event that the data tone is detected by tone circuit 430, the microprocessor generates delivering control signals and delivers the user identification code over lines 436 through switch 260 and over lines 462 through level shifters 460 to calling modem 110. Calling modem 110, at this time, is in communication with called modem 330. At this time, the microprocessor 270 waits for a predetermined period of time such as 0.5 seconds to sense the acknowledge signal in the level shifters 460 over lines 462, through switch 260 and lines 436. If the user identification code is not accepted (that is no acknowledgment is sent), the microprocessor 270 aborts the call and resets the circuit. However, if the user identification code is accepted and the acknowledgment signal is sent, the microprocessor 270 generates transmitting control signals and activates the solid state switch 270 to connect lines 462 to 492.

During the time frame when the switch 410 was activated to when the 2000 Hz was detected, a lamp 482 was activated to indicate that the call was in process. Upon receipt of the 2000 Hz tone, lamp 482 is extinguished and lamp 484 is activated. Upon the activation of the solid state switch, however, lamp 484 was extinguished and lamp 482 became activated again to indicate that the host computer 300 is now interconnected to the remote terminal computer 130. The microprocessor 270 continues to monitor the status of the communication between the remote terminal and the host computer by sensing the activation of level shifters 460 over lines 454 and when communication is terminated, lamp 482 is extinguished.

The operation of the checker/receiver circuit 350 will now be discussed in reference to FIG. 7. As mentioned before, the circuit shown in FIG. 4 is the same circuit for the receiver/checker circuit 350 except that the dialing circuit 420 and the tone and data circuits 430 are deleted as well as the accompanying interconnections. In this embodiment, the security key 240 (termed 390 in FIG. 3) is normally inserted and operates as the memory for the microprocessor 270 (termed 380 in FIG. 3). The security key 240 of FIG. 4 also contains all of the user identification codes.

Figure 7:
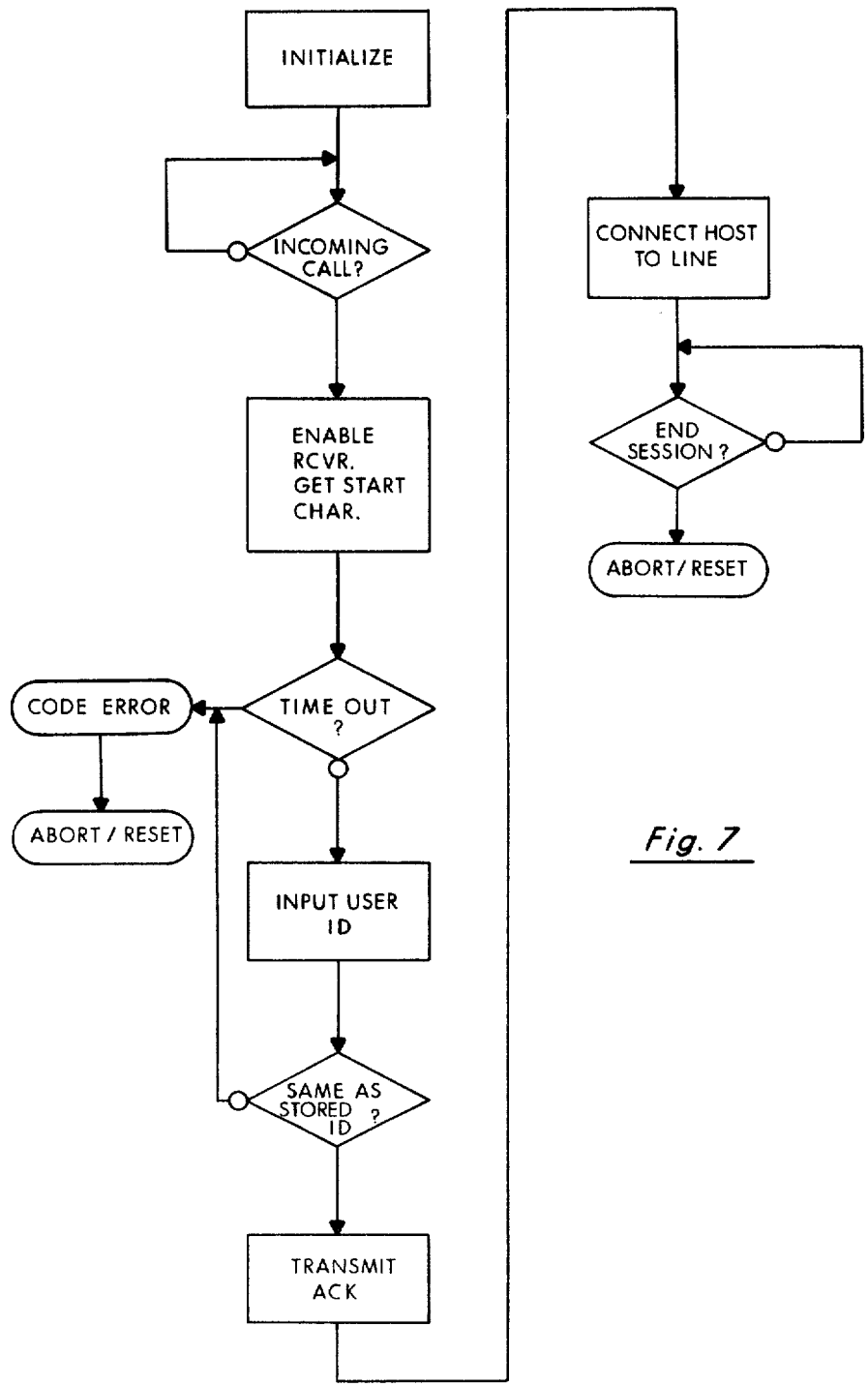

With reference to FIG. 7, the circuit is initialized and reset for operation. The circuit 350 cycles until a call comes in, the circuit 330 is enabled and the called modem 330 sends out the 2 KHz tone over lines 320. If the user identification code is not sent through the level shifters 460 over lines 454, within a predetermined time such as two seconds, a timeout occurs indicating there is an error with the code and the system is aborted and reset. However, if the code is received, then the code is compared by the microprocessor 270 with the data obtained from the security key 240 with that contained from the parallel input-output circuit 450. If it is not the same as the stored code, a code error occurs and the system aborts and resets. If the code is the same as that stored in the security key 240, an acknowledgement signal is transmitted over lines 436 through solid state switch 260 over lines 462 through level shifters 460 and to the first security circuit 200. The solid state switch 260 (370 in FIG. 3) is activated to connect the host computer 300 to the line. At this time, the remote terminal is interconnected in a communication path with the host computer. The microprocessor 270 (380 in FIG. 3) monitors the interconnection and at the end of transmission and communication, between the computer 300 and the remote terminal computer 130, an end of session is generated and the receiver/checker 350 aborts, resets, and releases the phone line.

As previously mentioned in some applications when leased full-time private lines are used, the calling circuitry is optional and not required. In this embodiment, dialing circuit 420 would not be utilized.

As can be appreciated, the present invention is modular in design and is not limited to a particular remote computer terminal type, the model and brand of the remote computer, or to the standards of communication for data transmission. Although the security dialer system of the present invention has been described in a preferred embodiment and with a degree of particularity, it is to be expressly understood that changes and variations may be made thereto under the teachings as set forth herein and as set forth in the following claims.

We claim:

1. An improved computer terminal security system interconnected with at least one terminal computer having a calling telephone and a calling modem at a remote location and further interconnected with a host computer having a called telephone connectable to said calling telephone over phone lines and a called modem, a plurality of first removable memory modules, a first security circuit connected to said at least one terminal computer, a second security circuit connected to said host computer, and said first security circuit being powered and operative only when any one of said first removable memory modules are inserted, said improved computer terminal security system comprising:

said first removable memory module containing the secret telephone number of said called telephone, a secret user identification code, and remote sequencing program instructions, said first memory module being further capable of being selectively erased and reprogrammed to incorporate different telephone numbers, user identification codes and remote sequencing program instructions in the event of a loss of secrecy, said first security circuit being further connected to said calling modem and to said calling telephone, said first security circuit comprising:

(a) first receiving means for selectively receiving said first memory module, (b) a switch, (c) first processing means connected to said first receiving means and to said switch and responsive to the activation of the switch for causing the first processing means to retrieve said remote sequencing program instructions, said secret user identification code, and said secret called telephone number from said first memory module, and for executing said sequencing program instructions for generating dialing means, delivering means, and first interconnecting means control signals, (d) dialing means connected to said calling telephone and receptive of said dialing means control signals and secret called telephone number from said first processing means for automatically dialing said called telephone through said calling telephone and over said phone lines, (e) delivering means connected to said calling telephone and receptive of said delivering means control signals and said secret user identification code from said first processing means for delivering said secret user identification code over said phone lines to said called telephone, and (f) first interconnecting means connected to said first processing means, to said calling modem, and to said terminal computer and receptive of said first interconnecting control signals for selectively interconnecting said terminal computer to said calling modem, said calling modem being connected to said calling telephone, a second removable, erasable and programmable memory module for containing a plurality of secret user identification codes and host sequencing program instructions, said second memory module capable of being selectively erased to incorporate different user identification codes and host sequencing program instructions in the event of said loss of secrecy, and said second security circuit further being connected to said called modem, and to said called telephone, said second security circuit comprising:

(a) second receiving means for selectively receiving said second memory module, said second security circuit being operable only when said second removable memory module is inserted, (b) second processing means connected to said second receiving means and receptive of said host sequencing program instructions and of said plurality of secret user identification codes for executing said host sequencing program instructions, (c) answering means connected to said called telephone and to said second processing means for automatically answering said calling telephone, said second processing means being further receptive of said delivered user identification code from said delivering means for comparing said delivered user identification code to the codes in said plurality of secret user identification codes and said second processing means being further capable of generating an acknowledgment signal when said delivered user identification code matches one of said plurality of user identification codes, (d) sending means connected to said called telephone and receptive of said acknowledgment signal from said second processing means for sending said acknowledgment signal through said called telephone over said phone lines to said first interconnecting means, said first interconnecting means upon receipt of said acknowledgment signal becoming activated to selectively interconnect said terminal computer to said calling modem, and (e) second interconnecting means connected to said second processing means, to said called modem, and to said host computer for becoming activated and interconnecting said host computer with said called modem only in response to said sending of said acknowledgment signal, said called modem being connected to said called telephone so that said host computer and said terminal computer can communicate over said phone lines, said host computer being accessible by said terminal only after said first and second interconnecting means become activated.

2. An improved computer terminal security system interconnected with at least one terminal computer having a calling telephone and a calling modem at a remote location and further interconnected with a host computer having a called telephone connectable to said calling telephone over phone lines and a called modem, a plurality of first removable memory modules, a first security circuit connected to said at least one terminal computer, a second security circuit connected to said host computer, and said first security circuit being powered and operative only when any one of said first removable memory modules are inserted, said improved computer terminal security system comprising:

said first removable memory module containing the secret telephone number of said called telephone, a secret user identification code, and remote sequencing program instructions, said first memory module being further capable of being selectively erased and reprogrammed to incorporate different telephone numbers, user identification codes and remote sequencing program instructions in the event of secrecy loss, first security circuit being further connected to said calling modem and to said calling telephone, said first security circuit comprising:

(a) first receiving means for selectively receiving said first memory module, (b) a switch, (c) first processing means connected to said first receiving means and to said switch and responsive to the activation of the switch for causing the processing means to retrieve said remote sequencing program instructions, said secret user identification code, and said secret called telephone number from said first memory module and for executing said sequencing program instructions for generating dialing means, delivering means, and first interconnecting means control signals, (d) dialing means connected to said calling telephone and receptive of said dialing means control signals and secret called telephone number from said first processing means for automatically dialing said called telephone through said calling telephone and over said phone lines, (e) delivering means connected to said calling telephone and receptive of said delivering means control signals and said secret user identification code from said first processing means for delivering said secret user identification code over said phone lines to said called telephone, and (f) first interconnecting means connected to said first processing means, to said calling modem, and to said terminal computer and receptive of said first interconnecting control signals for selectively interconnecting said terminal computer to said calling modem, said calling modem being connected to said calling telephone, said second security circuit being further connected to said called modem and to said called telephone, said second security circuit comprising:

(a) second processing means containing host sequencing program instructions and a plurality of user identification codes for executing said host sequencing program instructions, (b) answering means connected to said called telephone and to said second processing means for automatically answering said calling telephone, said second processing means being further receptive of said delivered user identification code from said delivering means for comparing said delivered user identification code to the codes in said plurality of user identification codes and said second processing means being further capable of generating an acknowledgment signal when said delivered user identification code matches one of said plurality of user identification codes, (c) sending means connected to said called telephone and receptive of said acknowledgment signal from said second processing means for sending an acknowledgment signal through said called telephone over said phone lines to said first interconnecting means, said first interconnecting means upon receipt of said acknowledgment signal becoming activated to selectively interconnect said terminal computer to said calling modem, said terminal computer being disconnected from said calling modem at all other times, and (d) second interconnecting means connected to said second processing means, to said called modem, and to said host computer for becoming activated and interconnecting said host computer with said called modem only in response to said sending of said acknowledgment signal, said host computer being disconnected from said called modem at all other times, said called modem being connected to said called telephone so that said host computer and said terminal computer can communicate over said phone lines, said host computer being accessible by said terminal only after said first and second interconnecting means become activated.

3. An improved computer terminal security system interconnected with at least one terminal computer having a calling telephone and a calling modem at a remote location and further interconnected with a host computer having a called telephone connectable to said calling telephone over phone lines and a called modem, a plurality of first removable memory modules, a remote security circuit connected to said at least one terminal computer, a host security circuit connected to said called modem, and said remote security circuit being powered and operative only when any one of said first removable memory modules are inserted, said improved computer terminal security system comprising:

said first removable memory module for containing the secret telephone number of said called telephone, a secret user identification code, and remote sequencing program instructions, said first memory module capable of being selectively erased and reprogrammed to incorporate different telephone numbers, user identification codes and remote sequencing program instructions in the event of secrecy loss, said remote security circuit connected to said calling modem and to said calling telephone, said remote security circuit comprising:

(a) first receiving means for selectively receiving said first memory module, (b) a switch, (c) first processing means connected to said first receiving means and to said switch and responsive to the activation of the switch for causing the first processing means to retrieve said remote sequencing program instructions, said secret user identification code, and said secret called telephone number from said first memory module and for executing said sequencing program instructions for generating dialing means, delivering means, and remote interconnecting means control signals, (d) dialing means connected to said calling telephone and receptive of said dialing means control signals and called telephone number from said first processing means for automatically dialing said called telephone through said calling telephone and over said phone lines, (e) delivering means connected to said calling telephone and receptive of said delivering means control signals and said secret user identification code from said first processing means for delivering said user identification code over said phone lines to said called telephone, and (f) remote interconnecting means connected to said first processing means, to said calling modem, and to said terminal computer and receptive of said remote interconnecting control signals for selectively interconnecting said terminal computer to said calling modem, said calling modem being connected to said calling telephone, said host security circuit connected to said called modem and to said called telephone, said host security circuit comprising:

(a) a host processing means containing sequencing program instructions and a plurality of selectively changeable user identification codes for executing the aforesaid sequencing program instructions, (b) answering means connected to said called telephone and to said second processing means for automatically answering said calling telephone, said second processing means being further receptive of said delivered user identification code from said delivering means for comparing said delivered user identification code to the codes in said plurality of user identification codes and said second processing means being further capable of generating an acknowledgment signal when said delivered user identification code matches one of said plurality of user identification codes, (c) sending means connected to said called telephone and receptive of said acknowledgment signal from said second processing means for sending an acknowledgment signal through said called telephone over said phone lines to said first interconnecting means, said first interconnecting means upon receipt of said acknowledgment signal becoming activated to selectively interconnect said terminal computer to said calling modem, said terminal computer being disconnected from said calling modem at all other times, and (d) host interconnecting means connected to said second processing means, to said called modem, and to said host computer for becoming activated and interconnecting said host computer with said called modem only in response to said sending of said acknowledgment signal, said host computer being disconnected from said called modem at all other times, said called modem being connected to said called telephone so that said host computer and said terminal computer can communicate over said phone lines, said host computer being accessible by said terminal only after said first and second interconnecting means become activated.

* * * * *